United States Patent
Wakuda

[11] Patent Number: 5,906,192
[45] Date of Patent: May 25, 1999

[54] MULTI-WIRE SAW

[75] Inventor: Junzou Wakuda, Kashihara, Japan

[73] Assignee: Sharp Kabushiki Kaisha, Osaka, Japan

[21] Appl. No.: 08/879,933

[22] Filed: Jun. 20, 1997

[30] Foreign Application Priority Data

Sep. 6, 1996 [JP] Japan ..................................... 8-236036

[51] Int. Cl.$^6$ ..................................................... B28D 1/02
[52] U.S. Cl. ..................... 125/16.02; 125/12; 125/16.03; 125/21; 83/651.1
[58] Field of Search .............................. 125/16.01–16.04, 125/21, 12; 451/296, 297, 303; 83/651.1

[56] References Cited

U.S. PATENT DOCUMENTS

| | | | |
|---|---|---|---|
| 5,564,409 | 10/1996 | Bonzo et al. .............................. | 125/12 |
| 5,575,189 | 11/1996 | Kiuchi et al. .......................... | 125/16.02 |
| 5,715,806 | 2/1998 | Tonegawa et al. .................. | 125/16.02 |
| 5,758,633 | 6/1998 | Hauser .................................. | 125/16.02 |

FOREIGN PATENT DOCUMENTS

| | | |
|---|---|---|
| 689891 | 1/1996 | European Pat. Off. . |
| 2428111 | 1/1975 | Germany . |
| 361297075 | 12/1986 | Japan ...................................... 125/12 |
| 7276219 | 10/1995 | Japan . |
| 7299729 | 11/1995 | Japan . |
| 7308918 | 11/1995 | Japan . |

OTHER PUBLICATIONS

Patent Abstracts of Japan—JP 63 237863—Oct. 4, 1988.
Patent Abstracts of Japan—JP 05 146968—Jun. 15, 1993.

*Primary Examiner*—David A. Scherbel
*Assistant Examiner*—George Nguyen

[57] ABSTRACT

In a multi-wire saw, each wire guide has a cylindrical exterior configuration, and is composed of sectorial portions which are circumferentially separated and integrally formed in the axial direction thereof. Each sectorial portion provided in the wire guide has wire guiding grooves extending circumferentially on the peripheral surface thereof in parallel along the axial direction of the wire guide, and one group of sectorial portions which are located alternately to another group, is projected further out than the other group of sectorial portions, to form an envelope of a cylindrical shape as an exterior form.

20 Claims, 3 Drawing Sheets

MULTI-WIRE SAW

BACKGROUND OF THE INVENTION

(1) Field of the Invention

The present invention relates to a multi-wire saw used for cutting a workpiece into slices or wafers, in particular relating to a wire-guide structure used in a multi-wire saw.

(2) Description of the Prior Art

A multi-wire saw is one of the cutting machines used for cutting a workpiece such as a silicon ingot, crystal, quartz, etc., having a cylindrical or block shape, into wafers, and is known to cut a workpiece being abutted against the lines of the wire which are arranged in parallel bearing abrasive grain thereon and are traveling at a high speed, into a multiple number of wafers. The multi-wire saw of this type has a configuration as schematically shown in FIG.1, and comprises feeding and collecting spools 22 and 23 for feeding and taking up wire 21, three wire guides 24 which have a cylindrical exterior configuration and are arranged in parallel to each other, and feeder and collector pulleys 25 and 26 disposed between spools 22, 23 and the wire guide 24 in the upper portion. In FIG.1, three wire guides 24 are used, but there are multi-wire saws which have two or four wire guides, as is well known.

Each wire guide 24 used in the multi-wire saw has a peripheral surface having a multiple number of circumferentially extending wire guiding grooves 27 formed thereon in parallel to each other at regular intervals along the axial direction of wire guide 24. Wire 21 fed from feeding spool 22 by way of feeder pulley 25 is tensioned across wire guides 24 whilst the wire is wound around each of the wire guiding grooves of wire guides 24 in turn, and is taken up by way of collector pulley 26 by collecting spool 23. The peripheral surface of each wire guide 24 is covered with a coating material 28 of urethane.

Lines of wire 21 arranged in parallel which are tensioned between a pair of wire guides 24 located in the lower portion of the multi-wire saw and are traveling at a high speed, are supplied drop-wise with an abrasive grain liquid from an abrasive grain liquid supplying nozzle 29. A workpiece 30 is pressed against the lines of wire 21 bearing the abrasive grain thereon. Therefore, workpiece 30 which is being pressed against the lines of wire 21 will be sliced into a multiple number of wafers having a thicknesses corresponding to respective spacing distances between successive lines of wire 21. The spacing interval between these lines of wire 21, or the spacing pitch between wire guiding grooves 27 on each wire guide 24 may be previously adjusted so that a multiple number of sliced pieces of workpiece 30 having a prescribed thickness can be obtained.

The conventional multi-wire saws thus configurated have suffered from the following drawbacks. First, a wire guide 24 which itself weighs about 60 Kg needs to be formed, on its peripheral surface, i.e., coating surface 28 with a multiple number of parallel wire guiding grooves 27. The job of machining the grooves needs much time and labor so is costly.

Further, since wire 21 runs at a high speed within wire guiding grooves 27 formed on the peripheral surface of wire guides 24, this unavoidably wears out wire guiding grooves 27 or damages them. With such damage, the spacing distance between the neighboring wire guiding grooves 27 changes, resulting in difficulty in maintaining cutting accuracy of workpiece 30. Moreover, when the cutting precision of workpiece 30 lowers, wire guides 24, which are heavy, should be replaced. This replacing task also needs much time and labor increasing the cost.

SUMMARY OF THE INVENTION

The present invention has been devised in view of the above drawbacks, it is therefore an object of the invention to provide a multi-wire saw wherein the time and labor and cost required for the machining process for the grooves of the wire guides and the replacement work thereof can be reduced and the machining precision of the workpiece can be maintained.

In order to attain the above object, the present invention has the following configurations.

In accordance with the first aspect of the invention, a multi-wire saw includes:

a plurality of wire guides arranged in parallel to each other, each wire guide having a cylindrical exterior configuration, and composed of sectorial portions which are circumferentially separated and integrally formed in the axial direction thereof, and is constructed such that each sectorial portion provided in the wire guide has wire guiding grooves extending circumferentially on the peripheral surface thereof in parallel along the axial direction of the wire guide, and one group of sectorial portions which are located alternately to another group, is projected further out than the other group of sectorial portions, to form an envelope of a cylindrical shape as an exterior form.

In accordance with the second aspect of the invention, a multi-wire saw having the above first feature is characterized in that the peripheral surface of each sectorial portion is coated with a coating material consisting of high-molecular hard urethane or ceramic.

In accordance with the third aspect of the invention, a multi-wire saw having the above first feature is characterized in that the interval between the wire guiding grooves formed in parallel to each other on the peripheral surface of the sectorial portion in each wire guide is identical.

In accordance with the fourth aspect of the invention, a multi-wire saw having the above second feature is characterized in that the interval between the wire guiding grooves formed in parallel to each other on the peripheral surface of the sectorial portion in each wire guide is identical.

In accordance with the fifth aspect of the invention, a multi-wire saw having the above first feature is characterized in that the interval between the wire guiding grooves formed in parallel to each other on the peripheral surface of one group of sectorial portions in the wire guide is differentiated from that of the other group.

In accordance with the sixth aspect of the invention, a multi-wire saw having the above second feature is characterized in that the interval between the wire guiding grooves formed in parallel to each other on the peripheral surface of one group of sectorial portions in the wire guide is differentiated from that of the other group.

In accordance with the seventh aspect of the invention, a multi-wire saw having the above first feature is characterized in that the sectorial portions provided for each wire guide has parallel arranged circular grooves formed on the peripheral surface thereof at changing intervals along the axial direction of the wire guide.

In accordance with the eighth aspect of the invention, a multi-wire saw having the above first feature is characterized in that the sectorial portions provided for each wire guide is held so that each sectorial portion can be detached slidably in the axial direction of the wire guide.

In accordance with the ninth aspect of the invention, a multi-wire saw having the above first feature is characterized in that the central shaft provided in each wire guide is cooled by a circulating coolant.

DESCRIPTION OF THE PREFERRED EMBODIMENTS

The embodiments of the present invention will hereinafter be described in detail with reference to the accompanying drawings.

Figure 1:
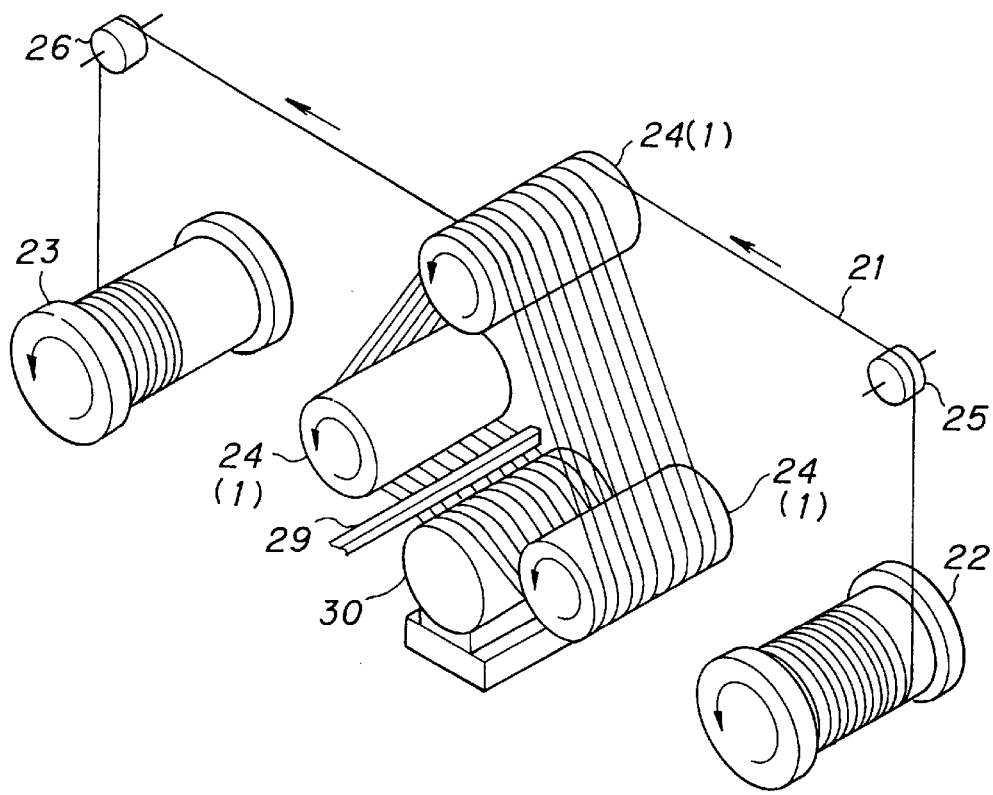
FIG.1 is an illustration schematically showing the overall structure of a multi-wire saw in accordance with the embodiment of the invention as well as the conventional configuration.
Figure 2:
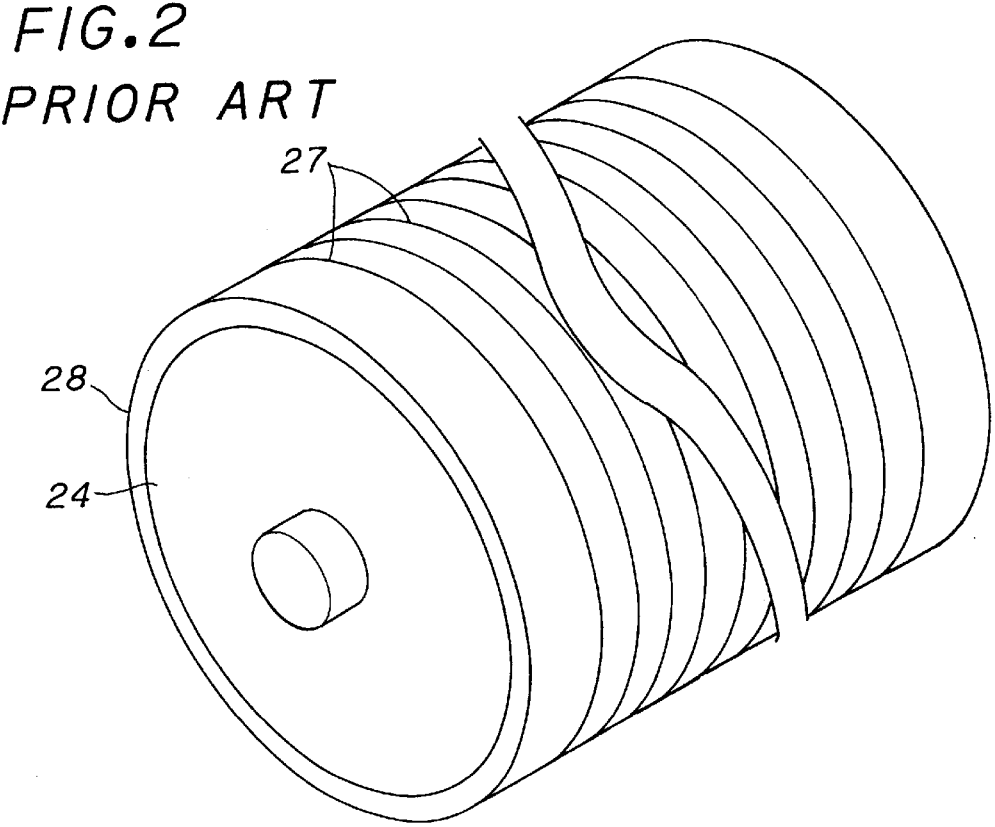
FIG.2 is an illustration showing the essential configuration of a conventional multi-wire saw, partially abbreviated.
Figure 3:
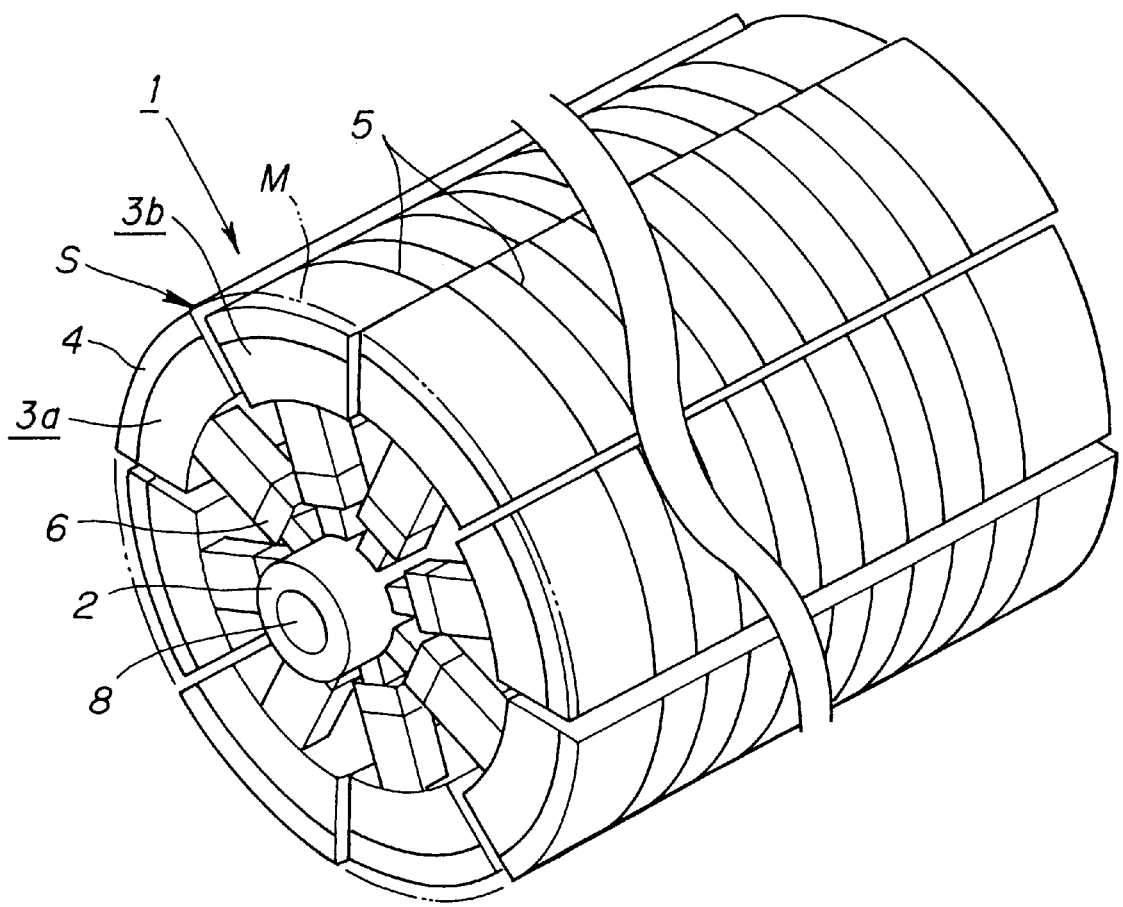
FIG.3 is an illustration showing the essential configuration of a wire guide provided in a multi-wire saw in accordance with the embodiment of the invention, partially abbreviated.
Figure 4:
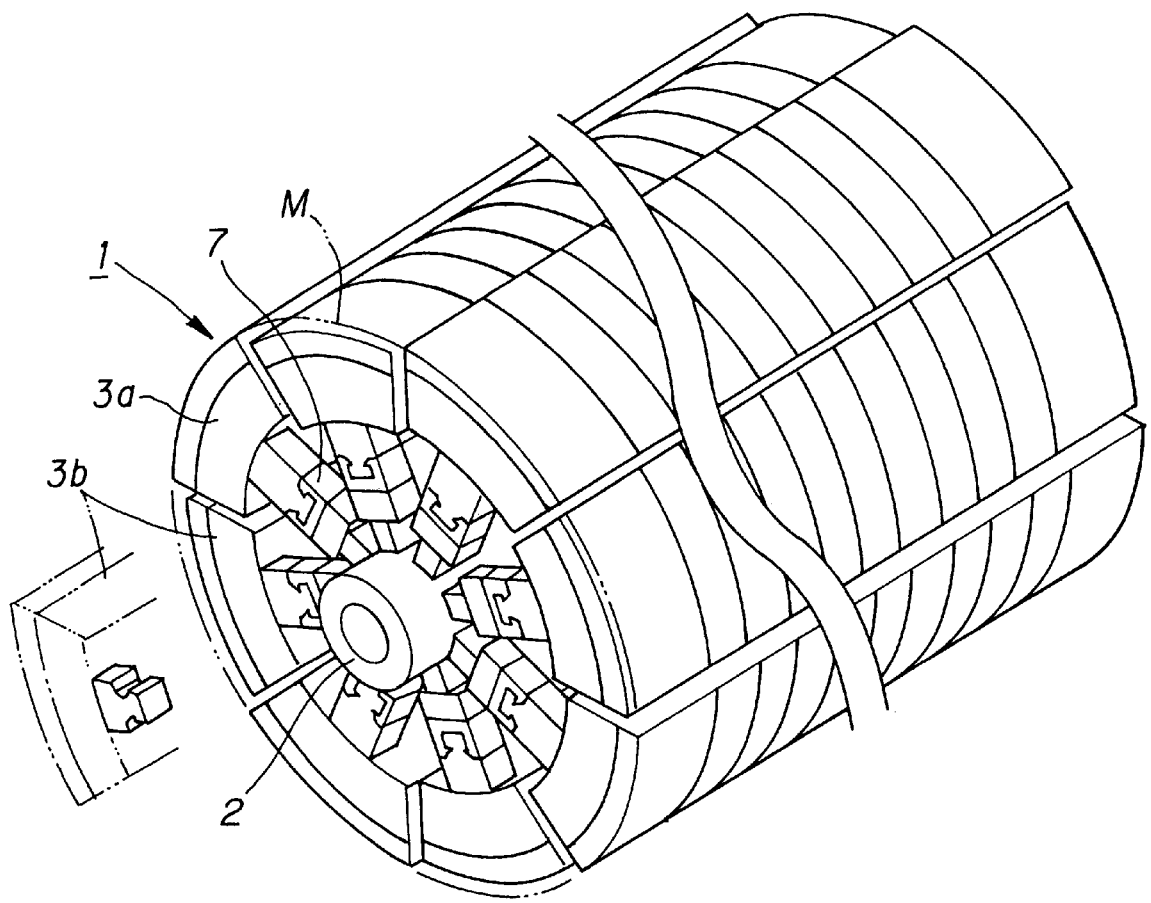
FIG.4 is an illustration showing a variational example of a wire guide of the invention.

FIG.3 is an illustration showing the essential configuration of a wire guide provided in a multi-wire saw in accordance with the embodiment of the invention, with part of the wire guide abbreviated. FIG.4 is a variational example of a wire guide. FIG.1 is an illustration showing schematically an overall structure of a multi-wire saw in accordance with the embodiment of the invention. In these figures, a reference numeral 1 designates a wire guide. Since the overall configuration of the multi-wire saw is basically the same as that of the conventional configuration except the wire guides, the overall configuration of the multi-wire saw will be described based on FIG.1 which has the same structure as that of the conventional one. In FIGS.3 and 4, identical components or corresponding components are allotted with the same reference numerals.

The multi-wire saw in accordance with this embodiment is a cutting machine used for cutting a workpiece 30 such as a silicon ingot, crystal, quartz, etc. This multi-wire saw cuts workpiece 30, for example, a silicon ingot etc., of 100 mm square×320 mm in length, into a multiple number of silicon wafers. During cutting, the workpiece is being pressed against the high-speed traveling lines of wire 21 arranged in parallel, bearing abrasive grain thereon, whilst it is fed at a rate of about 300 $\mu$m/min with respect to the running wire. This multi-wire saw has feeding and collecting spools 22 and 23 for feeding and taking up wire 21 of about 180 $\mu$m in diameter, three wire guides 1 which have a cylindrical exterior configuration and are arranged in parallel to each other, and feeder and collector pulleys 25 and 26 disposed between spools 22, 23 and the upper wire guide 1, and an abrasive grain liquid supplying nozzle which supplies an abrasive liquid (slurry) consisting of an oil and abrasive grain, drop-wise to the lines of wire 21 which are tensioned between a pair of wire guides 1 located in the lower portion and are traveling at a speed as high as 10 m/min. Here, in FIG.1, three wire guides 1 are used, but multi-wire saws which have two or four wire guides may be used, as used in the conventional configuration.

In this case, wire guides 1 have an overall configuration of a cylindrical shape as shown in FIG.3, e.g., 200 mm in outside diameter, 400 mm in length, and arranged in parallel to each other with a spacing distance of about 300 mm therebetween. Each wire guide 1 is divided circumferentially into eight sectorial portions 3a and 3b which each are integrally formed in the axial direction of the wire guide 1. These sectorial portions are mounted on a central shaft 2. More specifically, these sectorial portions 3a and 3b each have a cross-section having a central angle of almost 45 degrees with respect to the axis of central shaft 2, with gaps S having a spacing angle between neighboring sectorial portions 3a and 3b set at about 5 degrees with respect to the axis of central shaft 2. Here, although eight sectorial portions 3a and 3b are arranged radially to thereby constitute a wire guide 1, it is also possible to constitute a wire guide 1 by using more or fewer than eight sectorial portions, that is, the number of sectorial portions 3a and 3b should not be limited to eight.

Sectorial portions 3a and 3b constituting each wire guide 1 have a coating surface 4 made from a coating material such as hard urethane, e.g., high-molecular urethane or ceramic, with a prescribed thickness. Each sectorial portion 3a and 3b has a multiple number of wire guiding grooves 5 formed in parallel on the peripheral surface thereof along the circumferential direction of wire guide 1 at intervals of 560 $\mu$m along the axial direction of wire guide 1. Generally, the cross-section of wire guiding groove 5 is of a V shape. Here, the spacing distance between neighboring wire guiding grooves 5 is set at 560 $\mu$m, but this spacing distance is designated in accordance with the thickness of the slices to be cut from workpiece 30. A setting where wire 21 of 180 $\mu$m in diameter used with a groove pitch of 560 $\mu$m, is adopted when silicon wafers having a thickness of 350 $\mu$m±40 $\mu$m are to be fabricated. In this configuration, since wire guide 1 is constituted by a plurality of sectorial portions 3, it becomes possible to individually separate each of sectorial portions 3a and 3b from wire guide 1 to machine the grooves. Further, since each sectorial portions 3a and 3b have a coating surface 4 of a coating material such as hard urethane or ceramic formed on the peripheral surface thereon, damage and wearing out do not occur easily because of the provision of the coating material even if wire 21 travels at a high speed.

Each of sectorial portions 3a and 3b constituting each wire guide 1 may be arranged on central shaft 2 through a hydraulic cylinder 6 so that one group of alternating sectorial portions 3a and 3b, for example, portions 3a are projected further out than the other portions 3b by means of the advancing operation of hydraulic cylinder 6, to form an envelope M having a cylindrical shape as an exterior form. When sectorial portions 3a are used to form envelope M, first, with wire guides 1 deactivated, all the sectorial portions 3a and 3b are projected, and then sectorial portions 3b, in non-use, are made to retract leaving only the sectorial portions 3a projected. In this case, sectorial portions 3a were projected further out than the rest sectorial portions 3b, to form envelope M. When the advance/retract operation of the hydraulic cylinders 6 which are interposed between sectorial portions 3 and central shaft 2 of wire guide 1 is changed over, sectorial portions 3a are retracted or downed and then sectorial portions 3b become projected further out than sectorial portions 3a, thus allowing these other sectorial portions 3b to form an envelope M having the same shape.

Briefly, these sectorial portions 3a and sectorial portions 3b are adapted to be projected out alternately, so that wire 21 can be tensioned between wire guides 1 by one group of alternating sectorial portions 3, or either sectorial portions 3a or 3b, adjoining each other. In this case, the advancing and retracting mechanism which is interposed between central shaft 2 and each of sectorial portions 3 for projecting one group of sectorial portions 3a further out than the other group of sectorial portions 3b, is not limited to only hydraulic cylinder 6, but any other advancing/retracting mechanisms which utilize pneumatic cylinders, screws, links or other mechanical means can be adopted.

In the above configuration, the spacing distances between wire guiding grooves 5 formed on the peripheral surface of each sectorial portion 3a and 3b, are all set equal, regardless of sectorial portions 3a or 3b. In this configuration, even when wire guiding grooves 5 in sectorial portions 3a forming an envelope M of wire guides 1 across which wires 21 are tensioned have worn out or become damaged during cutting of workpiece 30 such as a silicon ingot etc., it is possible to continue the cutting operation under the same operating conditions by retracting one group of sectorial portions 3a and then projecting the other group of sectorial portions 3b. As an experimental result, when a slicing operation was performed by wire 21 which was tensioned across wire guides 1 having wire guiding grooves 5 formed on the group of sectorial portions 3a at spacing intervals of 560 $\mu$m, silicon wafers having a mean thickness of 341 $\mu$m were obtained. When the other group of sectorial portions 3b having wire guiding grooves 5 formed at the same interval was used, silicon wafers having a mean thickness of 347 $\mu$m were obtained. Both the results fell within the target thickness, i.e., 350 $\mu$m±40 $\mu$m, proving sufficient effectiveness of this configuration.

It is also possible to differentiate the spacing pitch of wire guiding grooves 5 on one group of sectorial portions 3a from the spacing pitch of wire guiding grooves 5 on the other group of sectorial portions 3b. When this configuration is adopted, by selecting one group of sectorial portions 3a or 3b to form a respective envelope M of wire guide 1, it is markedly easier to change the cutting thickness of a silicon ingot. It is further possible for each group of sectorial portions 3a and 3b to have wire guiding grooves 5 formed at differing intervals along the axial direction of wire guide 1. This configuration will be able to cut out wafers each having a different thickness from a single silicon ingot.

Next, a variational example of wire guides 1 provided in a multi-wire saw in accordance with the embodiment of the invention will be described with reference to FIG.4. In wire guide 1 shown in FIG.3, a plurality of sectorial portions 3a and 3b constituting wire guide 1 are each fixed to central shaft 2 with a hydraulic cylinder 6 interposed therebetween, however, this should not limit the configuration. As shown in FIG.4, a pair of guide members 7 are previously provided in parallel to each other on the hydraulic cylinder 6 affixed to central shaft 2 of wire guide 1, so that each sectorial portion 3a and 3b is held so that it can be individually detached by sliding it along these guide member 7 in the axial direction of wire guide 1. In this case, a pair of guiding members 7 are used to hold one sectorial portion 3a or 3b, but this does not limit the configuration. Needless to say, although unillustrated, it is possible to configure such a detachable engagement that each sectorial portion 3a and 3b is provided with a forked parts which engage a signal guide member.

In this configuration, it becomes possible to extract sectorial portions 3a or 3b which are in a down position and therefore have no wire 21 tensioned thereon, along the axial direction of wire guide 1, when wire guide 1 is deactivated. As a result, it is possible to easily replace any sectorial portions 3a and 3b which have been worn out or damaged.

When a cutting operation was performed using the saw after one group of sectorial portions 3a having wire guiding grooves 5 formed thereon at the aforementioned intervals were replaced, wafers having a means thickness of 343 $\mu$m were obtained. It is also possible to create a through-hole 8 along the axial direction of center axis 2 of wire guide 1 shown in FIGS.3 and 4 and circulate a coolant such as water through through-hole 8. In this case, since the center axis 2 of wire guide 1 is cooled by a circulating coolant, it is possible to inhibit heat generation and thermal expansion of the coating material during cutting by regulating the coolant at a temperature of, for example, 25° C.

As described heretofore, in accordance with the multi-wire saws having the first and second features of the invention, it is possible to individually separate sectorial portions from the wire guide to perform machining of the grooves, and wear and damage do not occur easily even when the wire runs at a high speed because of the characteristics of the coating material. As a result, it is possible to markedly reduce the time and labor as well as the cost required for the grooving work. Further this feature is effective in maintaining and improving the cutting accuracy.

In accordance with the multi-wire saws having the third and fourth features, the spacing intervals between the wire guiding grooves formed in parallel on the peripheral surface of the sectorial portions of each wire guide are set identical. Therefore, even if the wire guiding grooves in one group of the sectorial portions were worn out or damaged, this group of sectorial portions is retracted and then the other group of sectorial portions is projected to continue the cutting operation for a workpiece under the same conditions. In accordance with the multi-wire saw having the fifth and sixth features, the spacing interval between the wire guiding grooves formed in parallel on the peripheral surface of one group of sectorial portions are differentiated from that for the other group of sectorial portions, it is possible to change the cutting thickness of a workpiece very easily by selecting one group of sectorial portions to form an envelope.

In accordance with the multi-wire saw having the seventh feature, the spacing intervals of the circular grooves formed on the peripheral surface of sectorial portions are differentiated from each other along the axial direction of the wire guide, it is possible to produce a multiple number of slices each having different thickness from a single workpiece. Further, in accordance with the multi-wire saw of the eighth feature, since each sectorial portion is held so that it can be slidably detached along the axial direction of the wire guide, it is possible to replace each of the sectorial portions by pulling it out in the axial direction of the wire guide. Therefore, it is no longer necessary to change the whole wire guide, which is heavy, thus realizing a remarkable reduction in labor during replacement work. Finally, according to the multi-wire saw of the ninth feature, since each wire guide is cooled by circulating a coolant through the central shaft thereof, it is possible to suppress heat generation and thermal expansion of the coating material during cutting.

What is claimed is:

1. A multi-wire saw comprising:
   a plurality of wire guides arranged in parallel to each other, each wire guide having a cylindrical exterior configuration, and composed of sectorial portions having at least a first group and a second group which are circumferentially separated and integrally formed in the axial direction thereof, each one of said sectorial portions provided in the wire guide has wire guiding grooves extending circumferentially on the peripheral surface thereof in parallel along the longitudinal axial direction of the wire guide and separated from each other by a distance, and the first group of sectorial portions which are located alternately to the second group, is projected further out than the second group of sectorial portions, to form an envelope of a cylindrical shape as an exterior form.

2. A multi-wire saw according to claim 1, wherein the peripheral surface of each sectorial portion is coated with a coating material selected from the group consisting of high-molecular hard urethane and ceramic.

3. A multi-wire saw according to claim 1, wherein the distance between the wire guiding grooves formed in parallel to each other on the peripheral surface of the sectorial portion in each wire guide is identical.

4. A multi-wire saw according to claim 2, wherein the distance between the wire guiding grooves formed in parallel to each other on the peripheral surface of the sectorial portion in each wire guide is identical.

5. A multi-wire saw according to claim 1, wherein the distance between the wire guiding grooves formed in parallel to each other on the peripheral surface of one group of sectorial portions in the wire guide is differentiated from that of the other group.

6. A multi-wire saw according to claim 2, wherein the distance between the wire guiding grooves formed in parallel to each other on the peripheral surface of one group of sectorial portions in the wire guide is differentiated from that of the other group.

7. A multi-wire according to claim 1, wherein the sectorial portions provided for each wire guide has parallel arranged circular grooves formed on the peripheral surface thereof at different distances along the longitudinal axial direction of the wire guide.

8. A multi-wire saw according to claim 1, wherein the sectorial portions provided for each wire guide is held so that each sectorial portion can be detached slidably in the longitudinal axial direction of the wire guide.

9. A multi-wire saw according to claim 1, wherein a central shaft provided in each wire guide is cooled by a circulating coolant.

10. A multi-wire saw comprising:
   a plurality of wire guides arranged in parallel to each other, each wire guide having a cylindrical exterior configuration, and composed of sectorial portions which are circumferentially separated and integrally formed in the longitudinal axial direction thereof, each sectorial portion provided in the wire guide has wire guiding grooves extending circumferentially on the peripheral surface thereof in parallel along the longitudinal axial direction of the wire guide and separated from each other by a distance, and one sectorial portion is located alternately to a second sectorial portion.

11. A multi-wire saw according to claim 10, wherein the peripheral surface of each sectorial, portion is coated with a coating material consisting of high-molecular hard urethane.

12. A multi-wire saw according to claim 10, wherein the peripheral surface of each sectorial portion is coated with a coating material of ceramic.

13. A multi-wire saw according to claim 10, wherein the distance between the wire guiding grooves formed in parallel to each other on the peripheral surface of the sectorial portion in each wire guide is identical.

14. A multi-wire saw according to claim 11, wherein the distance between the wire guiding grooves formed in parallel to each other on the peripheral surface of the sectorial portion in each wire guide is identical.

15. A multi-wire saw according to claim 12, wherein the distance between the wire guiding grooves formed in parallel to each other on the peripheral surface of the sectorial portion in each wire guide is identical.

16. A multi-wire saw according to claim 10, wherein the distance between the wire guiding grooves formed in parallel to each other on one wire guide of sectorial portions is differentiated from that of a second wire guide.

17. A multi-wire saw according to claim 11, wherein the distance between the wire guiding grooves formed in parallel to each other on the peripheral surface of one wire guide sectorial portion is differentiated from that of a second wire guide sectorial portion.

18. A multi-wire saw according to claim 10, wherein the sectorial portions provided for each wire guide has parallel arranged circular grooves formed on the peripheral surface thereof at different distances along the axial direction of the wire guide.

19. A multi-wire saw according to claim 10, wherein means for detachably securing the sectorial portions to a shaft are provided.

20. A multi-wire saw according to claim 11, wherein a central shaft is provided in each wire guide together with means for circulating coolant in the central shaft.

* * * * *